UNITED STATES PATENT OFFICE 2,566,291

GLUCOSIDES FROM STROPHANTHUS SARMENTOSUS AND PROCESS OF MAKING SAME

Tadeus Reichstein, Basel, Switzerland, assignor to Ciba Pharmaceutical Products, Inc., Summit, N. J.

No Drawing. Application March 2, 1948, Serial No. 12,686. In Switzerland March 7, 1947

13 Claims. (Cl. 260—210)

This invention provides a process for obtaining two new glucosides from the seeds of *Strophanthus sarmentosus*. These glucosides will be referred to herein as sarmentoside A and sarmentoside B.

As compared with the important cardiac glucosides from Strophanthus kombé and Strophanthus gratus, the materials contained in *Strophanthus sarmentosus* have been less intensively worked up. Jacobs and Heidelberger (Journal of Biological Chemistry, vol. 81, page 765 [1929] have isolated a glucoside which they named sarmentocymarin. They were able to show that this glucoside decomposes relatively easily upon acid hydrolysis into sarmentogenin and sarmentose, a desoxy-sugar. Furthermore, it was observed that there is present in the extract, besides sarmentocymarin, glucosides of sarmentogenin with more than one sugar, of which at least one is a desoxy-sugar, which glucosides, in contradistinction to sarmentocymarin, cannot be extracted with chloroform.

According to the present invention new glucosides are obtained from *Strophanthus sarmentosus* by extracting with a chlorinated solvent an extract of the kind obtained from the seeds of *Strophanthus sarmentosus* by means of water and an organic solvent of low molecular weight soluble to a considerable extent in water, which extract may, if desired, be free from fatty and inert matter, then extracting the residual aqueous solution with an alcohol of low molecular weight, if desired, in admixture with a chlorinated solvent, and isolating from the extract solution so obtained the difficultly hydrolyzable glucosides sarmentoside A and sarmentoside B.

When recrystallised from a mixture of methanol and ether sarmentoside A forms colourless needles melting at 262.5–268° C. (with decomposition), and when recrystallised from a mixture of methanol and water it forms blunt needles melting at 274–280° C. It exhibits a strong digitalis action. Sarmentoside B crystallises from a mixture of acetone and ether in the form of colourless prisms melting at 263–269° C. Its acetate melts at 282.5–285° C. after recrystalisation from a mixture of acetone and ether.

As compared with the known sarmentocymarin and its derivatives of high molecular weight the new glucosides are distinguished in that they contain no desoxy-sugars. Consequently, they do not exhibit the typical colour reaction of Keller-Kiliani, and are more difficult to hydrolyze than sarmentocymarin and its derivatives of high molecular weight.

The extract of the kind hereinbefore referred to for use as the starting material in the process of the invention, and which may be free from fatty and inert material, may be prepared as follows: Seeds of *Strophanthus sarmentosus* are ground, and then defatted by percolation with petroleum ether or ether and dried. Fermentative splitting of the higher glucosides may then be brought about by mixing the defatted powder with water to form a paste, advantageously with the addition of a small quantity of a mixture of toluene and chloroform or another disinfecting agent, and allowing it to stand for one or several days at 0–40° C. The powder is then extracted by means of water and a solvent of low molecular weight which is soluble to a considerable extent in water, especially methanol, ethanol, acetone or ethyl acetate, until it no longer has a bitter taste. Ballast substances and coloured impurities may be removed from the extract so obtained, for example, by treatment in the usual manner with a lead compound such as lead hydroxide or neutral or basic lead acetate. When necessary, the filtered solution is rendered slightly acid and concentrated by evaporation under reduced pressure.

In accordance with the invention the above mentioned extract is extracted with a chlorinated solvent, such as chloroform, ethylene chloride, methylene chloride or trichlorethylene. In this manner there are removed more especially sarmentocymarin, cymarin and other easily extractable glucosides. From the residual aqueous solution sarmentoside A and sarmentoside B, in addition to other glucosides, are then removed by extraction with an alcohol of low molecular weight such as methanol, ethanol, ethylene glycol, propanol, butanol or amyl alcohol. If desired, more especially when an alcohol miscible with water is used there may be added a chlorinated solvent, for example, one of those mentioned above.

When it is desired to remove the easily hydrolyzable glucosides containing more than one molecule of sugar, this can be done at any desired stage, for example, before or after extraction with the chlorinated solvent or after the final extraction. For this purpose hydrolysis may be brought about, for example, by boiling with a dilute acid such as 0.1 N-sulphuric acid and alcohol. The resulting genins are then removed by extraction with a chlorinated solvent and the aqueous phase is further treated in accordance with the invention.

Sarmentoside A and sarmentoside B are isolated from the extracts obtained by means of an alcohol of low molecular weight, if desired, in admixture with a chlorinated solvent, or from residues resulting from the evaporation of such extracts. For this purpose the material is, for example, allowed to crystallize from a solvent mixture such as a mixture of an alcohol and ether, whereby sarmentoside A separates. By chromatography of the mother liquor sarmentoside B is obtained and also a further portion of sarmentoside A. Sarmentoside B is advantageously purified by way of an ester thereof, for example, the acetate. Instead of being separated by fractional crystallization the sarmentosides may be previously separated, for example, by chromatography, especially of their esters, or by a demixing operation, and then purified by recrystallization.

The new glucosides are intended for the use as therapeutic agents or as intermediate products for manufacture of medicaments.

The following examples illustrate the invention:

Example 1

1 kilogram of finely ground seeds of *Strophanthus Sarmentosus* is defatted by percolation with cold petroleum ether, dried, and then extracted with dilute alcohol until the powder no longer has a bitter taste. The combined extracts are immediately or after being concentrated by evaporation under reduced pressure (below 40° C.), mixed with a suspension in distilled water of freshly prepared lead hydroxide which has been washed until neutral. After agitation for 1 hour the lead precipitate is removed by centrifuging, the deposited material is again suspended in dilute alcohol, and again centrifuged. The clear supernatant solutions are combined, mixed with a small quantity of dilute sulphuric acid, when necessary, and then evaporated under reduced pressure to a volume of 500 cc. The solution is then agitated 4 times with equal volumes of chloroform. The chloroform extracts yield about 14 grams of a mixture of sarmentocymarin, cymarin and other easily extractable glucosides, from which mixture about 4 grams of pure sarmentocymarin can be obtained.

The residual aqueous solution contains a mixture of the new glucosides with glucosides of high molecular weight, which are derived from sarmentocymarin. The aqueous solution is then extracted 7 times in each case with twice its volume of a mixture of 2 parts by volume of chloroform and 1 part by volume of ethanol, after which the aqueous solution no longer has a bitter taste. The extracts are washed with a small quantity of sodium carbonate solution, and evaporated to yield about 50 grams of a glucoside mixture in the form of a pale brown foam which is soluble in a mixture of chloroform and alcohol. In order to remove easily hydrolyzable glucosides which are still present, the glucoside mixture is boiled for ½ hour in a mixture of equal parts of methanol and 0.1 N-sulphuric acid. After evaporation under reduced pressure a crude genin mixture can be extracted with chloroform, from which mixture a further quantity of sarmentogenin can be recovered. The residual acid aqueous solution is extracted in the manner described above with a mixture of chloroform and alcohol, whereby about 40 grams of a water-soluble mixture of glucosides less easily decomposed are obtained.

The crude glucoside mixture is dissolved in a small quantity of methanol, mixed with ether until turbidity sets in, and allowed to stand at a low temperature for several days. The crude sarmentoside A which crystallises out in a quantity of 4.9 grams, melts at 245–255° C. By recrystallisation twice from a mixture of methanol and ether colourless needles melting at 262.5–268° C. (with decomposition) are obtained and by recrystallisation from a mixture of methanol and water sarmentoside A is obtained in the form of blunt needles melting at 274–278° C. (with decomposition) $[\alpha]_D^{18} = -40.5° \pm 3°$ (in dioxane of 95 per cent. strength). The residue amounting to 35 grams obtained from the mother liquors, is dissolved in chloroform, and fractionated by chromatography over aluminum oxide by the elutriation method. The first elutriate, obtained mainly with a mixture of chloroform and methanol in the ratio 9:1, yields further quantities of crystalline sarmentoside A. By continuing the elutriation with a mixture in the ratio 4:1 amorphous elutriates are obtained which are acylated by the usual methods. The acetate produced with pyridine and acetic anhydride melts at 282.5–285° C. (with decomposition) after recrystallisation from a mixture of acetone and ether. By cautious hydrolysis in the usual manner, for example by means of potassium bicarbonate, the acetyl groups can be split off, and in this manner sarmentoside B is obtained, which when recrystallised from a mixture of acetone and ether forms prisms melting at 263–269° C. (with decomposition);

$$[\alpha]_D^{20} = -4.5° \pm 2°$$

(in acetone).

Example 2

An extract obtained by the method hereinbefore described and treated with a solution of basic lead acetate, and obtained from 1 kilogram of seeds of *Strophanthus sarmentosus* is concentrated under reduced pressure to a volume of about 250 cc., and then a sufficient quantity of dilute sulphuric acid is added to produce a concentration of the acid of about 0.1 N-H$_2$SO$_4$. The resulting solution is boiled for 30 minutes, and after cooling is extracted 7 times with equal volumes of chloroform. The chloroform extract contains sarmentogenin, the product of hydrolysis of sarmentocymarin and its derivatives which contain more than 1 molecule of sugar. The residual aqueous solution is then extracted 7 times in each case with twice its volume of a mixture of 2 parts by volume of chloroform and 1 part by volume of methanol, after which the solution has only a slightly bitter taste. Instead of using the aforesaid mixture for the extraction, there may be used butanol or amyl-alcohol alone or in admixture with chloroform. The chloroform-methanol extracts or butanol extracts or amyl alcohol extracts are washed with a small quantity of sodium carbonate solution and water, dried and evaporated. There remain behind about 35–40 grams of an amorphous oil which becomes foamy upon drying. This amorphous glucoside mixture contains the whole quantity of water-soluble products which are less easily hydrolyzable. Sarmentoside A and sarmentoside B are obtained therefrom by the method described in Example 1 by the crystallisation of sarmentoside A from a mixture of methanol and ether, followed by chromatography of the mother liquors and the preparation of the crystalline sarmentoside B-acetate.

As an alternative to the above described method of isolation, the mixture of sarmentoside A and sarmentoside B may for example be acetylated with pyridine and acetic anhydride, and then chromatographed from solution in benzene over aluminum oxide. By elutriation with a mixture of benzene and chloroform there is obtained sarmentoside A-acetate, which cannot be crystallised. By elutriation with chloroform sarmentoside B-acetate is obtained which melts at 282.5–285° C. (with decomposition) after recrystallisation from a mixture of acetone and ether. The two acetates can be hydrolysed to form the free glucosides in the manner described in Example 1 with respect to the B-acetate.

The extracts to be treated as claimed herein can alternatively be produced as follows:

The defatted powder (about 750 grams) obtained from 1 kg. of seeds is first vigorously agitated with 2.6 liters of ice water, allowed to stand at 0° C. for 2 hours and then suction-filtered through a layer of diatomaceous earth (celite 535). The filtrate which must be clear, is then maintained at 0° C.; in addition to a part of the glycosides it contains in particular the enzymes which split off glucose, but no allomerising enzymes. The moist filter residue is completely extracted with alcohol of 50 per cent. strength, (about 6 times with 2 liters each time), which operation may also be performed at an elevated temperature. The extracts are evaporated under reduced pressure to about 0.6 liter and the turbid concentrate combined with the first water-extract, mixed with about 50 cc. of toluene and allowed to stand at 35° C. for about 4 days. The combined extracts are then again diluted with alcohol, purified with Pb(OH)$_2$, concentrated and then extracted by agitation in accordance with the invention, for example, with chloroform or with a mixture of chloroform and alcohol.

Having thus described the invention, what is claimed is:

1. A process for the manufacture of new glucosides from *Strophanthus sarmentosus* which comprises subjecting an alcohol-free extract, which is obtained from the seeds of *Strophanthus sarmentosus* with the aid of water and a neutral water-soluble organic solvent containing at the most 4 carbon atoms, to extraction by means of an aliphatic chlorinated solvent containing not more than two carbon atoms whereby undesired glucosides are removed, and then subjecting the residual aqueous solution containing the desired difficultly hydrolyzable glucosides sarmentoside A and sarmetoside B to extraction with an alcohol of low molecular weight whereby the said desired glucosides are extracted from said solution, and isolating from the extract solution so obtained the said difficultly hydrolyzable glucosides sarmentoside A and sarmentoside B.

2. A process for the manufacture of new glucosides from *Strophanthus sarmentosus* which comprises subjecting an alcohol-free extract, which is obtained from the seeds of *Strophanthus sarmentosus* with the aid of water and a neutral water-soluble organic solvent containing at the most 4 carbon atoms and which is freed from fatty and inert matter, to extraction by means of an aliphatic chlorinated solvent containing not more than two carbon atoms whereby undesired glucosides are removed; and then subjecting the residual aqueous solution containing the desired difficultly hydrolyzable glucosides sarmentoside A and sarmentoside B to extraction with an alcohol of low molecular weight whereby the said desired glucosides are extracted from said solution, and isolating from the extract solution so obtained the said difficultly hydrolyzable glucosides sarmentoside A and sarmentoside B.

3. A process for the manufacture of new glucosides from *Strophanthus sarmentosus* which comprises subjecting an alcohol-free extract, which is obtained from the seeds of *Strophanthus sarmentosus* with the aid of water and a neutral water-soluble organic solvent containing at the most 4 carbon atoms and which is freed from fatty and inert matter, to extraction by means of an aliphatic chlorinated solvent containing not more than two carbon atoms whereby undesired glucosides are removed; and then subjecting the residual aqueous solution containing the desired difficultly hydrolyzable glucosides sarmentoside A and sarmentoside B to extraction with an alcohol of low molecular weight in admixture with an aliphatic chlorinated solvent containing not more than two carbon atoms whereby the said desired glucosides are extracted from said solution, and isolating from the extract solution so obtained the said difficultly hydrolyzable glucosides sarmentoside A and sarmentoside B.

4. A process for the manufacture of new glucosides from *Strophanthus sarmentosus* which comprises subjecting an alcohol-free extract, which is obtained from the seeds of *Strophanthus sarmentosus* with the aid of water and a neutral water-soluble organic solvent containing at the most 4 carbon atoms and which is freed from fatty and inert matter, to extraction by means of an aliphatic chlorinated solvent containing not more than two carbon atoms whereby undesired glucosides are removed, and then subjecting the residual aqueous solution containing the desired difficultly hydrolyzable glucosides sarmentoside A and sarmentoside B to extraction with a mixture of 2 parts by volume of chloroform and 1 part by volume of lower alkanol whereby the said desired glucosides are extracted from said solution, and isolating from the extract solution so obtained the said difficultly hydrolyzable glucosides sarmentoside A and sarmentoside B.

5. A process according to claim 2, wherein the extract is treated with a hydrolysing agent at any stage of the process in order to remove the easily hydrolyzable glucosides which contain more than one sugar molecule, and the resultant genins are extracted with an aliphatic chlorinated solvent containing not more than two carbon atoms.

6. A process according to claim 5, wherein a dilute acid is used to hydrolyse the easily hydrolyzable glucoside which contains more than one molecule of sugar.

7. A process according to claim 2, wherein the chlorinated solvent is chloroform.

8. A process according to claim 3, wherein the chlorinated solvent is chloroform.

9. A process according to claim 2, wherein the alcohol of low molecular weight is an aliphatic alcohol with 1–5 carbon atoms.

10. A process according to claim 2, wherein the alcohol of low molecular weight is amyl alcohol.

11. A member selected from the group consisting of the lower fatty acid esters of sarmentoside A and the lower fatty acid esters of sarmentoside B.

12. Sarmentoside A-acetate.

13. Sarmentoside B-acetate which melts at 282.5–285° C. (with decomposition).

TADEUS REICHSTEIN.

REFERENCES CITED

The following references are of record in the file of this patent:

UNITED STATES PATENTS

| Number | Name | Date |
|---|---|---|
| 2,179,204 | Stoll et al. | Nov. 7, 1939 |

OTHER REFERENCES

Jacob et al., Jour. Biol. Chemistry, vol. 81, pages 765 to 779 (1929).

Schmutz and Reichstein, Pharm. Acta. Helv., v. 22, pages 167–89, May 1947.